(12) United States Patent
Lin

(10) Patent No.: US 10,803,341 B2
(45) Date of Patent: Oct. 13, 2020

(54) METHOD AND COMPUTER SYSTEM OF WHITE POINT DETECTION

(71) Applicant: MultiTek Inc., Hsinchu (TW)

(72) Inventor: Chin-An Lin, Taipei (TW)

(73) Assignee: Augentix Inc., Hsinchu (TW)

( * ) Notice: Subject to any disclaimer, the term of this patent is extended or adjusted under 35 U.S.C. 154(b) by 121 days.

(21) Appl. No.: 15/854,700

(22) Filed: Dec. 26, 2017

(65) Prior Publication Data
US 2019/0197342 A1 Jun. 27, 2019

(51) Int. Cl.
*G06K 9/46* (2006.01)
*H04N 9/73* (2006.01)
*G06T 5/00* (2006.01)

(52) U.S. Cl.
CPC ......... *G06K 9/4652* (2013.01); *G06K 9/4647* (2013.01); *G06K 9/4661* (2013.01); *G06T 5/002* (2013.01); *H04N 9/73* (2013.01); *G06T 2207/10024* (2013.01)

(58) Field of Classification Search
CPC ......... G06T 5/002; G06T 5/007; G06T 5/008; H04N 9/74; H04N 9/3182
USPC ......................................... 382/162–168, 172
See application file for complete search history.

(56) References Cited

U.S. PATENT DOCUMENTS

| | | | |
|---|---|---|---|
| 2006/0203311 A1 | 9/2006 | Weng | |
| 2006/0290957 A1* | 12/2006 | Kim | H04N 1/4072 358/1.9 |
| 2007/0019881 A1* | 1/2007 | Curtis | H04N 1/4074 382/274 |

FOREIGN PATENT DOCUMENTS

| | | | |
|---|---|---|---|
| TW | 201340727 A | 10/2013 | |
| TW | 201830337 A1 * | 8/2018 | G09G 5/02 |

\* cited by examiner

*Primary Examiner* — Dwayne D Bost
*Assistant Examiner* — Stephen M Brinich
(74) *Attorney, Agent, or Firm* — Winston Hsu

(57) ABSTRACT

A method of white point detection for an image is disclosed. The method includes determining a plurality of pixels of the image as a plurality of white point candidates; estimating a plurality of candidate confidences according to a plurality of brightness values corresponding to the plurality of white point candidates; and determining a plurality of white points of the image according to the plurality of candidate confidences.

10 Claims, 5 Drawing Sheets

METHOD AND COMPUTER SYSTEM OF WHITE POINT DETECTION

BACKGROUND OF THE INVENTION

1. Field of the Invention

The present invention relates to a method and computing system of white point detection for an image, and more particularly, to a method and a computing system of detecting white points by considering pixel location and brightness.

2. Description of the Prior Art

With the development of the technology, all kinds of digital devices are provided. The demand of digital image processing technology for industry and consumers increases. In a conventional system, gray world, white balance and color constancy and so on are methods to adjust the image for image processing, wherein the white balance is an adjustment of intensities of the colors, e.g. red, green and blue primary colors, which eliminates light effect to colors and correctly renders neutral colors. The white balance detects an illuminant under which the image was captured and adjusts pixel colors according to the illuminant. For example, a Retinex method is utilized to find a maximal value in all three channels (i.e. red, green and blue) of the image and detects the illuminant. However, the Retinex method is too simple to resist against noises and suffers from over-exposed pixels in the image.

Therefore, how to solve the above mentioned problems of the Retinex method has become an important topic.

SUMMARY OF THE INVENTION

It is therefore an object of the present invention to provide a method and computer system of detecting white points by considering pixel location and brightness for the image to resist against noise with a cost effective way, so as to improve the disadvantages of the prior art.

An embodiment of the present invention discloses a method of white point detection for an image, comprising determining a plurality of pixels of the image as a plurality of white point candidates; estimating a plurality of candidate confidences according to a plurality of brightness values corresponding to the plurality of white point candidates; and determining a plurality of white points of the image according to the plurality of candidate confidences.

An embodiment of the present invention further discloses a computer system capable of performing white point detection in an image, comprising a processing device; and a memory device coupled to the processing device, for storing a program code instructing the processing device to perform a process, wherein the process comprises determining a plurality of pixels of the image as a plurality of white point candidates; estimating a plurality of candidate confidences according to a plurality of brightness values corresponding to the plurality of white point candidates; and determining a plurality of white points of the image according to the plurality of candidate confidences.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
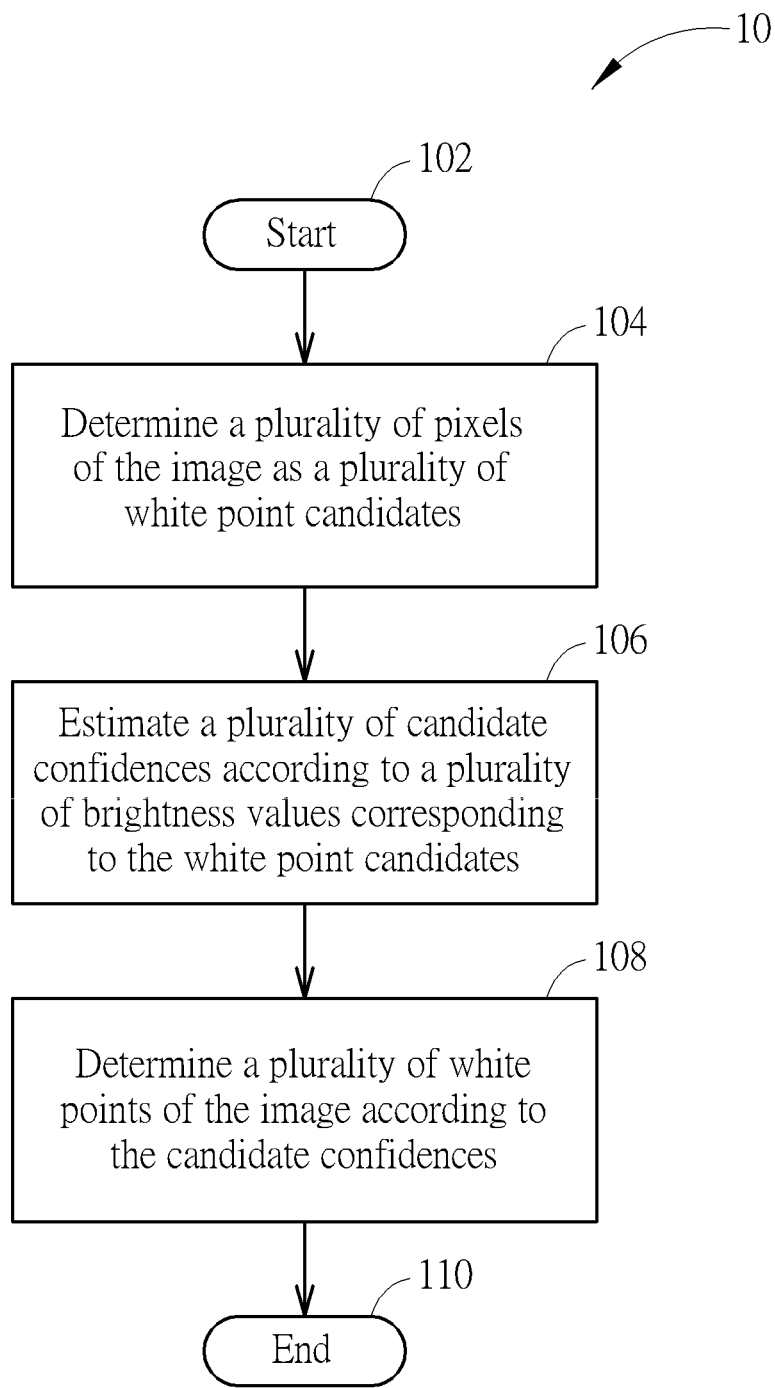
FIG. 1 is a schematic diagram of a white point detection process according to an embodiment of the present invention.

Please refer to FIG. 1, which is a schematic diagram of a white point detection process 10 according to an embodiment of the present invention. The white point detection process 10 for an image includes the following steps:

Step 102: Start.

Step 104: Determine a plurality of pixels of the image as a plurality of white point candidates.

Step 106: Estimate a plurality of candidate confidences according to a plurality of brightness values corresponding to the white point candidates.

Step 108: Determine a plurality of white points of the image according to the candidate confidences.

Step 110: End.

Figure 2:
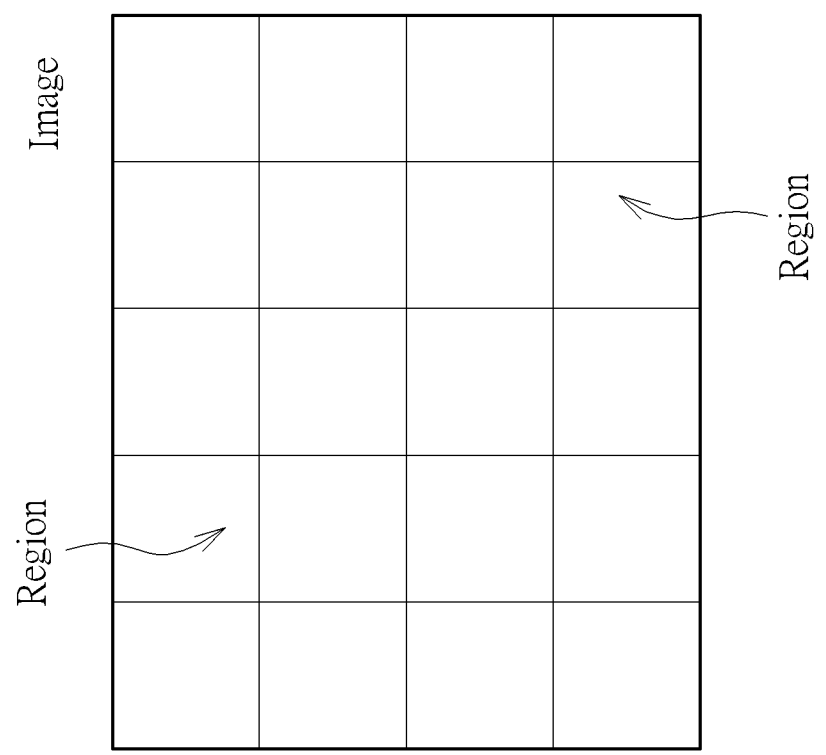
FIG. 2 is a schematic diagram of an image with a plurality of regions.

In step 104, the pixels with largest channel values are found and determined as white point candidates. In an embodiment, all pixels, e.g. red, green and blue, with the largest channel values are found in the entire image and determined as white point candidates. In another embodiment, the image is separated to a plurality of regions as depicted in FIG. 2, one or more pixels with the largest channel values are determined in each region, wherein the channel value is related to the image, e.g. if an RGB image is 24-bit, each channel has 8 bits for red, green and blue, respectively, and a range of the channel value is 0-255. Notably, there is no pixel with the largest channel value when the image is white, or more than one pixel is determined as the white point candidate with the largest channel value in each region in the image, when the image is over-exposed.

After determining the white point candidates of the image, in step 106, the white point candidates are estimated with corresponding candidate confidences according to the brightness values, wherein the brightness values are determined by finding a maximal brightness value of the brightness values nearby each of the white point candidates, so as to avoid that the white point candidate is in a group of over-exposed points, and converts the maximal brightness value of each of the white point candidate into the candidate confidence.

Figure 3:
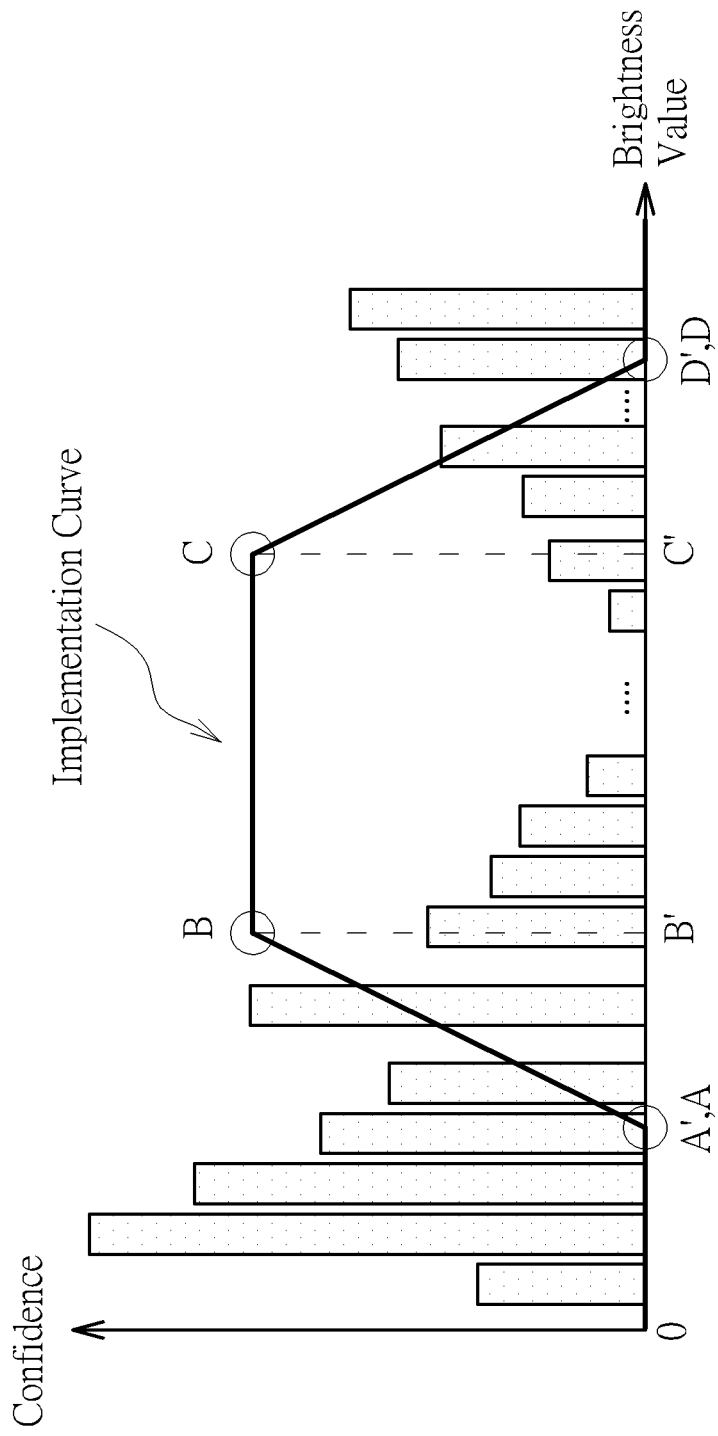
FIG. 3 is a conversion of confidence according to an embodiment of the present invention.

Please refer to FIG. 3, which is a conversion chart of confidences according to an embodiment of the present invention. The conversion chart includes an implementation curve with points A, B, C and D, which respectively corresponds to A', B', C' and D' of the brightness values. A range of brightness values between B' and C' is the range of the maximal brightness values converted to the corresponding candidate confidences. In an embodiment, after determining the maximal brightness values nearby each of the white point candidates in each of the region for the image, (e.g., when the image has 64 regions, which means that there are 64 maximal brightness values of the image), the maximal brightness values are converted into the candidate confidences according to the conversion chart. Notably, the conversion of the brightness values to the confidences may be implemented by luminance values of the pixels to the confidences, or the confidence may be implemented by weight, and not limited herein. Moreover, the range of brightness values of the conversion chart may be modified and not limited herein.

After estimating the candidate confidences of the brightness values, in step 108, the candidate confidences corresponding to the white point candidates of low confidence are rejected from the candidate confidences. That is, as can be seen in FIG. 3, assume that there are 64 regions in the image, the 64 white point candidates are converted into corresponding candidate confidences accordingly. When the brightness value is close to 0, the corresponding white point candidate may be noise; and when the brightness value is larger than D, the corresponding white point candidate may be overexposed. Therefore, based on the conversion chart, the brightness values which are not within the range of B' and C' are converted to confidence of 0 and being rejected accordingly. The remaining candidate confidences within the candidate confidences are determined as white points of the image. In other words, the white point candidates with low confidences are rejected from the candidate confidences, and the remaining candidate confidences with higher confidences are determined as white points of the image.

Moreover, in an embodiment, according to the white point detection process 10, the white points with the largest channel values are determined in a center of a plurality of ranges. The ranges may be circles, squares, circular sectors or any other shapes, and not limited thereto. In addition, a size of the range is related to a size of the image.

Figure 4:
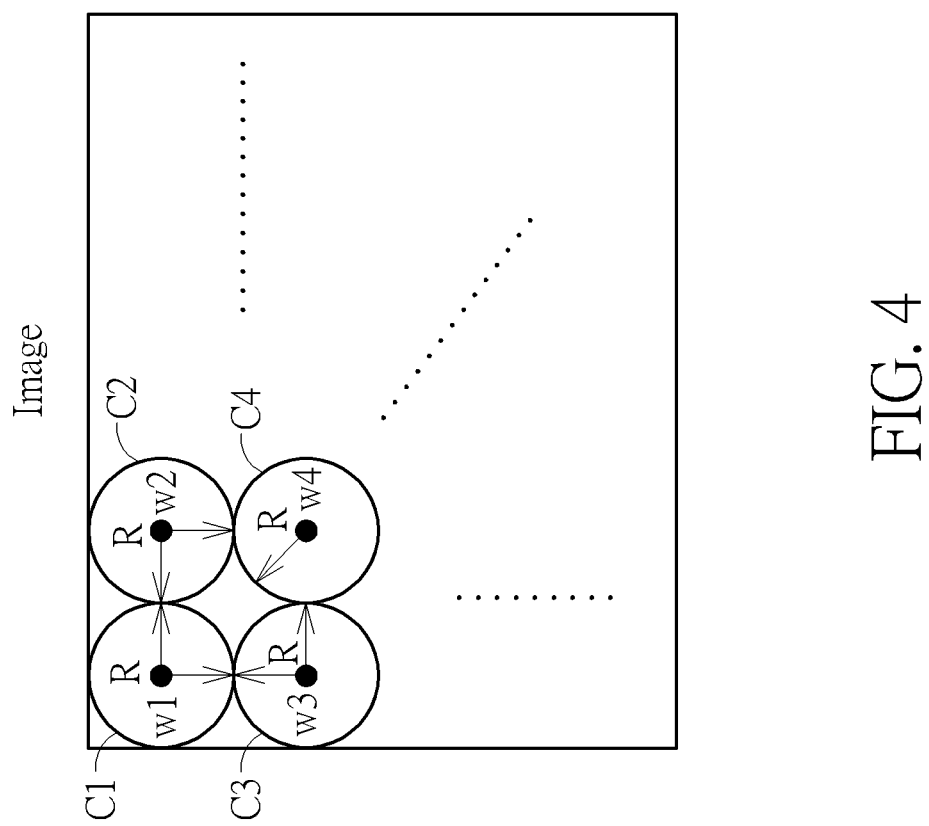
FIG. 4 is a schematic diagram of white points of the image according to an embodiment of the present invention.

In details, please refer to FIG. 4, which is a schematic diagram of white points of the image according to an embodiment of the present invention. First, a white point w1 with the largest channel is determined in a center of a circle C1, wherein the circle C1 has a radius R, and the center may be defined as a geometrical center such as a centroid, an in-center or so on. Secondly, a white point w2 with the largest channel value is determined in a center of a circle C2. And white points w3, w4 with the largest values are determined accordingly in a center of circles C3, C4. Notably, a location of the circle C1 is determined randomly or determined by a default setting, the circles C2, C3 and C4 have radius R same with the circle C1, and the radius R is related to a size of the image, for example, 1/64 of a length or a width of the image, and not limited thereto. Therefore, each of the white points w1, w2, w3 and w4 has a quite distance, e.g. the distance is greater than or equal to 2R between each other in this embodiment, but not limited thereto.

Notably, the embodiments stated above illustrates the concept of the present invention, those skilled in the art may make proper modifications accordingly, and not limited thereto. For example, the conversion method of brightness and confidence may be implemented by other methods, e.g. determining luminance of pixels by a YUV color space, or defining different ranges of brightness value of the conversion chart, and not limited to the white point detection method stated above.

Figure 5:
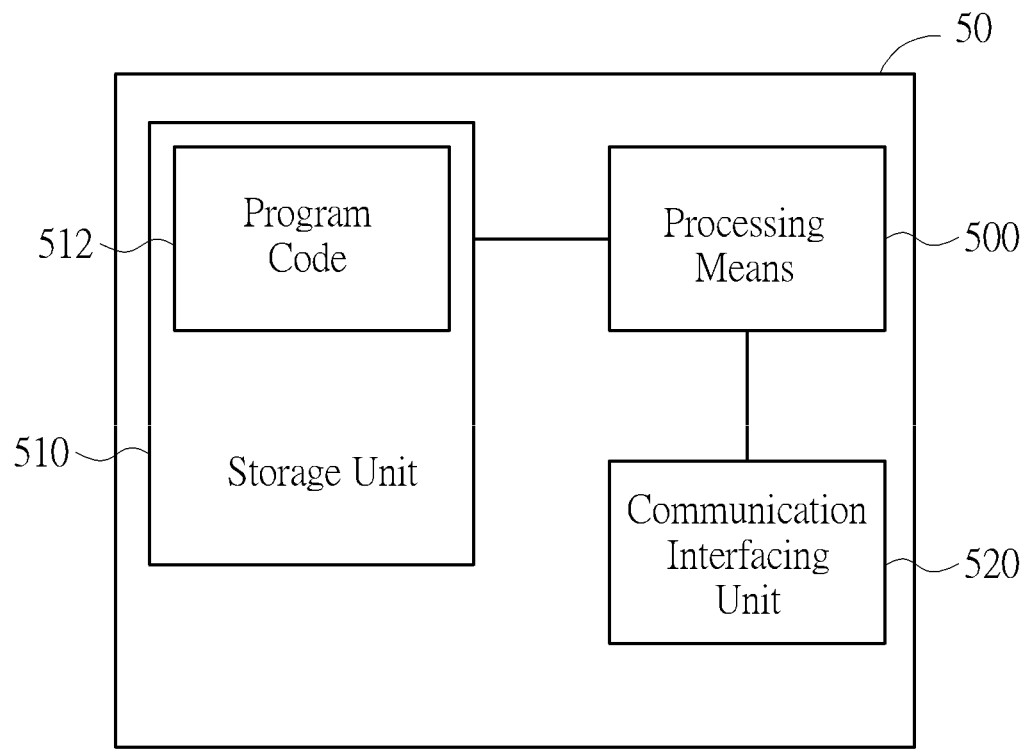
FIG. 5 is a schematic diagram of a computer system according to an example of the present invention.

Please refer to FIG. 5, which is a schematic diagram of a computer system 50 according to an example of the present invention. The computer system 50 may be utilized for realizing the white point detection method stated above, but is not limited herein. The computer system 50 may include a processing means 500 such as a microprocessor or Application Specific Integrated Circuit (ASIC), a storage unit 510 and a communication interfacing unit 520. The storage unit 510 may be any data storage device that can store a program code 512, accessed and executed by the processing means 500. Examples of the storage unit 510 include but are not limited to a subscriber identity module (SIM), read-only memory (ROM), flash memory, random-access memory (RAM), CD-ROM/DVD-ROM, magnetic tape, hard disk and optical data storage device.

In summary, the white point detection method of the present invention detects white points by considering pixel location and brightness for the image to resist against noise with a cost effective way, and thereby improves quality of images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of white point detection for an image, comprising:
   determining a plurality of pixels of the image as a plurality of white point candidates;
   estimating a plurality of candidate confidences according to a plurality of brightness values corresponding to the plurality of white point candidates; and
   determining a plurality of white points of the image according to the plurality of candidate confidences;
   wherein the image includes a plurality of regions, and each of the plurality of regions includes at least one pixel having a largest channel value;
   wherein the step of estimating the plurality of candidate confidences according to the plurality of brightness values corresponding to the plurality of white point candidates comprises:
      finding a maximal brightness value of the plurality of brightness values nearby each of the plurality of white point candidates; and
      converting the maximal brightness value of the white point candidate to the candidate confidence.

2. The method of claim 1, wherein each of the plurality of white points has a largest channel value in a range, and the each of the plurality of white points is a center of the range.

3. The method of claim 2, wherein the range is a circle or a square, and a size of the range is related to the image.

4. The method of claim 2, wherein the center is a centroid or an in-center of the range.

5. The method of claim 1, wherein the step of determining the plurality of white points of the image according to the plurality of candidate confidences comprises:
   rejecting candidate confidences corresponding to white point candidates of low confidence from the plurality of candidate confidences; and
   determining remaining candidate confidences within the plurality of candidate confidences as the plurality of white points of the image.

6. A computer system capable of performing white point detection in an image, comprising:
   a processing device; and
   a memory device coupled to the processing device, for storing a program code instructing the processing device to perform a process, wherein the process comprises:
      determining a plurality of pixels of the image as a plurality of white point candidates;

estimating a plurality of candidate confidences according to a plurality of brightness values corresponding to the plurality of white point candidates; and determining a plurality of white points of the image according to the plurality of candidate confidences;

wherein the image includes a plurality of regions, and each of the plurality of regions includes at least one pixel having a largest channel value;

wherein the step of estimating the plurality of candidate confidences according to the plurality of brightness values corresponding to the plurality of white point candidates comprises:

finding a maximal brightness value of the plurality of brightness values nearby each of the plurality of white point candidates; and converting the maximal brightness value of the white point candidate to the candidate confidence.

7. The computer system of claim 6, wherein each of the plurality of white points has a largest channel value in a range, and the each of the plurality of white points is a center of the range.

8. The computer system of claim 7, wherein the range is a circle or a square, and a size of the range is related to the image.

9. The computer system of claim 7, wherein the center is a centroid or an in-center of the range.

10. The computer system of claim 6, wherein the step of determining the plurality of white points of the image according to the plurality of candidate confidences comprises:

rejecting candidate confidences corresponding to white point candidates of low confidence from the plurality of candidate confidences; and determining remaining candidate confidences within the plurality of candidate confidences as the plurality of white points of the image.

\* \* \* \* \*